United States Patent [19]
Kronenberg et al.

[11] Patent Number: 5,665,970
[45] Date of Patent: Sep. 9, 1997

[54] DIRECTIONAL RADIATION DETECTOR AND IMAGER

[75] Inventors: Stanley Kronenberg, Skillman; George J. Brucker, West Long Branch, both of N.J.

[73] Assignee: The United States of America as represented by the Secretary of the Army, Washington, D.C.

[21] Appl. No.: 687,095

[22] Filed: Jul. 3, 1996

[51] Int. Cl.$^6$ .............................. G01T 1/18; G01T 1/20; G01T 1/24; G01T 7/00

[52] U.S. Cl. ................. 250/374; 250/336.1; 250/361 R; 250/367; 250/370.01

[58] Field of Search ...................... 250/336.1, 367, 250/366, 374, 370.1, 370.11, 390.11, 390.12, 370.01, 370.09, 361 R

[56] References Cited

U.S. PATENT DOCUMENTS

| | | | |
|---|---|---|---|
| 4,136,282 | 1/1979 | Cox et al. | 250/336.1 |
| 4,259,575 | 3/1981 | LeVert et al. | 250/336.1 |
| 4,954,709 | 9/1990 | Zigler et al. | 250/374 X |
| 5,345,084 | 9/1994 | Byrd et al. | |

OTHER PUBLICATIONS

Dellin, T.A. et al, "Second Generation Analytical Photo–Compton Current Methods", IEEE Transactions on Nuclear Science NS–22, No. 6, pp. 2549–2555, (Dec. 1975).

*Primary Examiner*—Edward J. Glick
*Attorney, Agent, or Firm*—Michael Zelenka; William H. Anderson

[57] ABSTRACT

A radiation sensor and/or imager is formed by sandwiching two materials having different atomic numbers (Z) around a radiation detector, such as scintillator or Geiger-Mueller type radiation counters, or solid state radiation detectors, such as those made of silicon). In one embodiment of the present invention, a thin layer of lead (Pb) is placed on one side of a Geiger-Mueller radiation counter and a layer of Lucite™ is disposed on the opposite side. One example, of a preferred Geiger-Mueller counter which may be used in the present invention is a modified pancake Geiger-Mueller counter with thin ruby mica windows, approximately 2.8 mg/cm$^2$ thick on both sides. By disposing a high Z material on one side of a radiation detector such as a Geiger-Mueller (GM) or a Scintillator Counter (SC) and a low Z material on an opposite side of either type of the counter, it is possible to detect the photo-Compton electrons emitted from the high or low Z material in the forward or backward directions and the attenuation of the emitted electrons by the high Z material. Because the Geiger-Mueller or scintillation counter can detect single events, the directional radiation detector according to the present invention can detect radiation intensities down to background radiation levels, which is approximately 0.15 μGy h$^{-1}$. Given the difference in the count rate (or intensity), the direction of the radiation source may be easily calculated by simply rotating the detector or by having two counters displaced in different angles (such as 180 degrees) so as to be able to take the difference of the number counts (or mirrors of the intensities).

19 Claims, 19 Drawing Sheets

DIRECTIONAL RADIATION DETECTOR AND IMAGER

GOVERNMENT INTEREST

The invention described herein may be manufactured, used, sold, imported, and/or licensed by or for the Government of the United States of America without the payment to us of any royalties thereon.

FIELD OF INTEREST

This invention relates to radiation detectors and, more particularly, to radiation detectors that provide the direction of the source of the radiation and/or radiation images.

BACKGROUND OF THE INVENTION

It is often desirable to determine the direction of a radiation source, e.g., gamma radiation, fast neutrons, etc. such as in tomography, astronomy, and civil defense applications. However, because most forms of radiation interact with matter through the processes of the photoelectric effect and Compton scattering, the angular distribution of the photoelectrons and Compton electrons (the energy forms which may be detected from radiation) are altered and skewed by these scattering events. Thus, it has been difficult to accurately determine the angle of incidence of the radiation.

Various techniques have been used to provide detectors with a directional capability. One commonly used directional detector is a collimated instrument where shielding is used to restrict the angular acceptance of radiation by the detector and to reduce background contributions from other directions. Thus, a maximum output is obtained only when an aperture in the shielding is aligned with a radiation source. In some instances, a rotating collimator aperture or multiple apertures are used to obtain source direction information. However, these collimated instruments have several disadvantages such as distortion of incoming radiation by interactions with the collimator walls, a small solid angle of acceptance when a high directional resolution is necessary thus reducing radiation intensity, and poor angular resolution when a large solid angle of acceptance is necessary.

Other directional detector designs have used filament-type detectors to obtain directional information. For example, Chupp et al., "A Direction Neutron Detector for Space Research Use," *IEEE Transactions on Nuclear Science* NS-13, pp. 468–477 (Feb. 1966), teaches aligning filament axes toward the radiation source to provide a directional output. As another example, Stetson et at., "A Directional Scintillation Counter for Neutrons," 6 *Nuclear Instruments and Methods,* pp. 94–95 (1960), suggests the use of an array of filament arrays that use the forward-peaked angular distribution of protons from n-p collisions to obtain directional effects.

In many applications, weight and portability are important considerations in selecting a detector. For example, space applications require light weight devices, and simplicity is desired since repair is not feasible. These same considerations are also applicable to mobile detectors, particularly hand held devices or devices that might require access to restricted locations.

U.S. Pat. No. 5,345,084, issued Sep. 6, 1994, to Byrd et at, and entitled, "Directional fast-neutron detector," teaches another type of directional radiation detector, which is limited to detecting fast neutrons, wherein a plurality of omnidirectional fast neutron radiation detectors are arranged in a close packed relationship to form a segmented symmetric detector. A processor arithmetically combines the incident radiation counts from the plurality of detectors to output a signal functionally related to a direction of a source for said radiation. In one embodiment of the Byrd device, four detectors are arranged in paired relationship with front-back and left-right symmetry. Output radiation counts are combined by subtracting counts from the detectors having front-back symmetry and subtracting counts from the detectors having left right symmetry. The resulting differences form a vector quantity indicating the direction for the source of the radiation. However, as stated this detector is limited to detecting the direction of fast neutrons and has a low directional resolution.

Therefore, there exists a need for a directional detector/imager of radiation sources which has a high angle of acceptance with high resolution and which can detect a plurality of different types/intensities of radiation sources. The present invention addresses this need.

SUMMARY OF THE INVENTION

Accordingly, one object of the present invention is to provide a radiation detector which can detect the direction of a radiation source with a $4\pi$ solid angle of acceptance at a resolution which can be as low as a few minutes of a degree of arc.

Another object of the present invention is to provide such a directional radiation detector which can be altered to detect several different types/intensities of radiation sources.

Still another object of the present invention is to provide a directional radiation detector which can detect radiation intensities down to background radiation.

Still another object of the present invention is to provide an imager of various sources of radiation.

These and other objects are accomplished by the present invention which uses two materials having different atomic numbers (Z) to surround or sandwich a radiation detector, such as scintillator or Geiger-Mueller type radiation counters, or solid state radiation detectors, such as those made of silicon. In one embodiment of the present invention, a thin layer of lead (Pb) is placed on one side of a Geiger-Mueller radiation counter and a layer of Lucite™ is disposed on the opposite side. Because the Geiger-Mueller counter can detect single events, the directional radiation detector according to the present invention can detect radiation intensities down to background radiation levels, which is approximately 0.15 $\mu$Gy h$^{-1}$. One example, of a preferred Geiger-Mueller counter which may be used in the present invention is a modified pancake. Geiger-Mueller counter with thin ruby mica windows, approximately 2.8 mg/cm$^2$ thick on both sides.

By disposing a high Z material on one side of a radiation detector (such as a Geiger-Mueller (GM) or a Scintillator Counter (SC)) and a low Z material on the opposite side of either type of counter, it is possible to detect the photo-Compton electrons emitted from the high or low Z material in the forward or backward directions and the attenuation of incident gammas. Given the difference in the count rate (or intensity), the direction of the radiation source may be easily calculated or the counter may be simply rotated to determine the angle at which a maximum change in response of the detector occurs thus locating the point source. By having two counters displaced in different angles (such as 180 degrees) so as to be able to take the difference of the number of counts (or mirrors of the intensities), the present invention can detect the direction of a radiation source much more easily and as will be explained can provide a image of the radiation sources as a function of the intensities. This is possible because more electrons are emitted from a low Z material in a forward direction, such as in Lucite™, than from a high Z material in a forward or a backward direction, such as in lead. The advantages of a monitor design based on a GM or a scintillation counter are their capability to reduce the limiting intensity to two or three times the natural background which is about 0.15 µGy h$^{-1}$. Accordingly, with the present invention, using a GM tube or scintillation counter, gamma sources with intensities approaching the natural background can be identified and located.

BRIEF DESCRIPTION OF THE DRAWINGS

These and other objects of the invention will become readily apparent in light of the Detailed Description of the Invention and the attached drawings wherein.

DETAILED DESCRIPTION OF THE INVENTION

Figure 1:
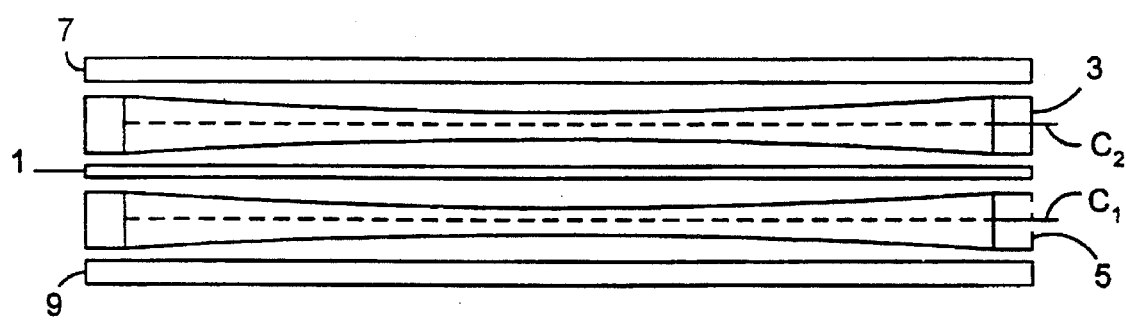
FIG. 1 is a cross-section view of one embodiment of the present invention using a pair of pancake Geiger-Mueller (GM) counters.

Now referring to FIG. 1, FIG. 1 shows a cross-section view of a device according to the present invention. As shown, a single high Z (atomic number) material layer 1 is sandwiched between two pancake Geiger-Mueller (GM) counters 3 and 5. The two GM counters 3 and 5 are then sandwiched on their outer faces by two low Z material layers 7 and 9. Appropriate materials for the high and low Z materials would be lead and polymethl methacrylate (Lucite™ or similar plastic), respectively. It should be noted that although two GM counters are shown, the present invention will also function with one GM counter sandwiched between one layer of high Z material and one layer of low Z material. However, by using a single counter, the detector of the present invention will have to be rotated (as will be discussed below) through 360 degrees rather than 180 degrees to obtain the same data.

Preferably for this embodiment, the GM counter is a special pancake counter which is constructed with thin ruby mica windows, 2.8 mg/cm$^2$ thick, on both sides. This makes it possible to place a high and low Z shield on either exterior side of the counter, so that the lower energy electrons generated by photons will penetrate the thin mica windows and produce pulses.

Although Lucite™ and lead are obvious choices for a low and high Z material, respectively, other materials with varying thicknesses could also be used in the present invention. The selection of material and thickness of material, as will be made apparent, depends largely on the atomic number of the material and the materials' forward and backward electron emission when irradiated. In this respect, various high and low Z materials and thicknesses were investigated for use in the present invention. In particular, various combinations of materials were used in the device of FIG. 1 to determine which materials would be most suitable as the high and low Z materials of the present invention.

Figure 5:
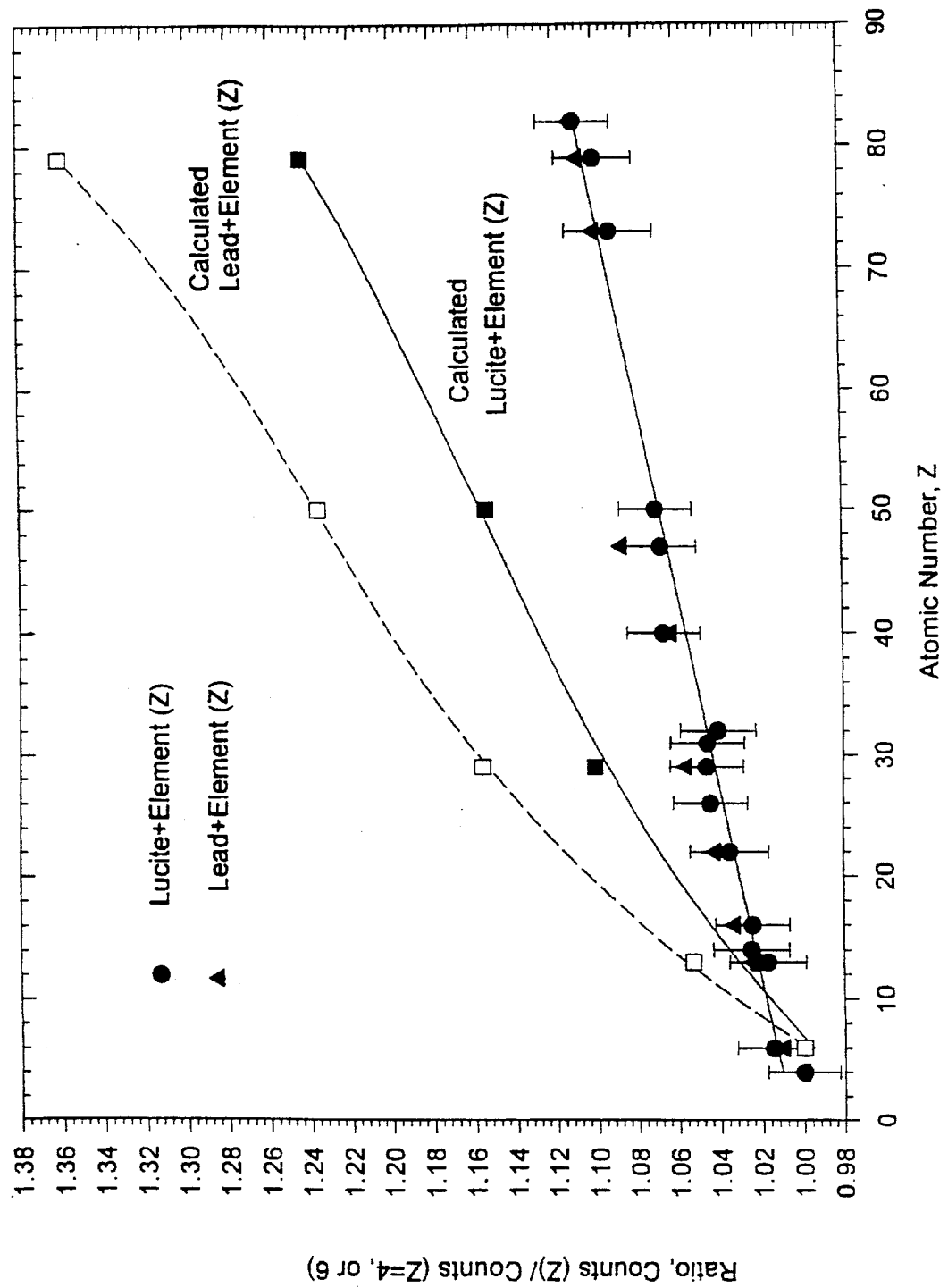
FIG. 5 illustrates the response of the Pancake counter of FIG. 1 for Lucite combined with 16 different Z materials, for lead with 11 different materials, and both sets of data compared with calculated results.

FIG. 5 illustrates the response of the pancake GM counter of FIG. 1 for Lucite™ combined with 16 different Z materials, and for lead combined with 11 different Z elements, and both sets of data for these same conditions compared to known calculated results. As shown, the data (circles and triangles) represent the Lucite™ (or polyethylene) and lead from these tests, respectively. The ratio counts for each element relative to those for the lowest Z material used in each test (i.e. Be and C) is plotted versus atomic number in FIG. 5. It can be seen from FIG. 5 that the dependence of the counting ratio on Z is approximately linear. The ratio is defined to be the counts for any element, Z, divided by the counts obtained with the lowest Z element (i.e. Be or C) in each experiment. This linear behavior applies to both shielding combinations of Lucite™ and lead with the other elements. The error bars include spreads due to experimental reproducibility for 15 observations per element and counting statistics. For reasons of clarity, only the error bars for the Lucite™ plus the different Z materials are shown. For the other combination, the error bars are about the same. As stated above, the calculated values have error bars of about +/−20%. The worst case discrepancy of calculated relative to measured value occurs for the highest Z number, namely, Z=79 (gold). For the Lucite™+shield element, this is 12%, and 22% for the results obtained with lead+Z element.

Figure 6:
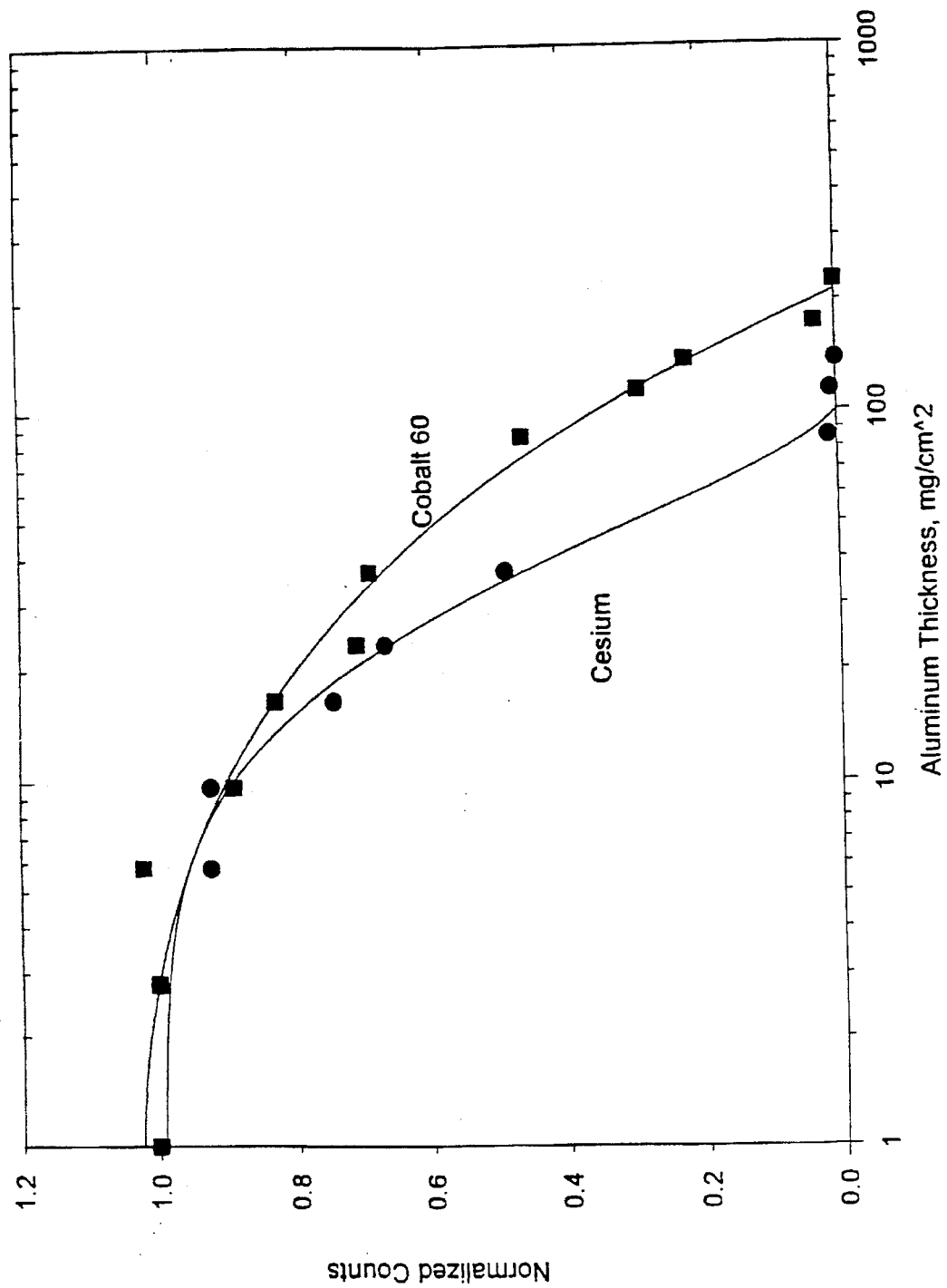
FIG. 6 is a Feather-like analysis of electrons emitted in the back direction from a 144 mg/cm$^2$ lead emitter to the pancake counter of FIG. 1 when exposed to cobalt-60 and cesium-137 photons.

Another important parameter of the shielding that sandwiches the detector is the back-emission of electrons from the shield behind the pancake counter. FIG. 6 shows a feather-like analysis of the photo-Compton electrons emitted in the backwards direction from a thin lead shield used with the pancake counter of FIG. 1 which was irradiated with cobalt and cesium gamma radiation. Aluminum absorbers of various thicknesses were inserted between the counter and the lead shield to obtain this analysis of backward emitted electrode. In particular, the aluminum absorbers were increased in thickness and were inserted between the pancake counter and the lead shield behind the counter until the counts were reduced to a constant value (obtained by eliminating the lead shield and increasing the aluminum thickness until this number was achieved). In this Feather-like analysis of the electrons were produced by $^{60}$cobalt and $^{137}$cesium photons. The results of this analysis demonstrate that the electron spectra are characteristic of these sources.

Further, FIG. 6 shows these results for both sources that were obtained by subtracting the saturated value and normalizing them to the maximum count number. The maximum absorber thickness for $^{60}$cobalt gammas was 223 mg/cm$^2$ and 135 mg/cm$^2$ for cesium photons in these experiments. These values correspond to maximum electron energies of 500 and 350 keV, respectively. The electron can easily penetrate the 2.8 Mg/cm$^2$ mica window of the counter which has a 35 keV electron threshold. (The pancake counter is unique in that it has two identical mica windows on each side of the GM tube.) Thus, in the present invention, back-emitted electrons are produced from the high Z material shield and the maximum energies of these backward emitted electrons are degraded relative to the expected average energies of 700 keV for cobalt photon energies, and 500 keV for cesium radiation.

Figure 7:
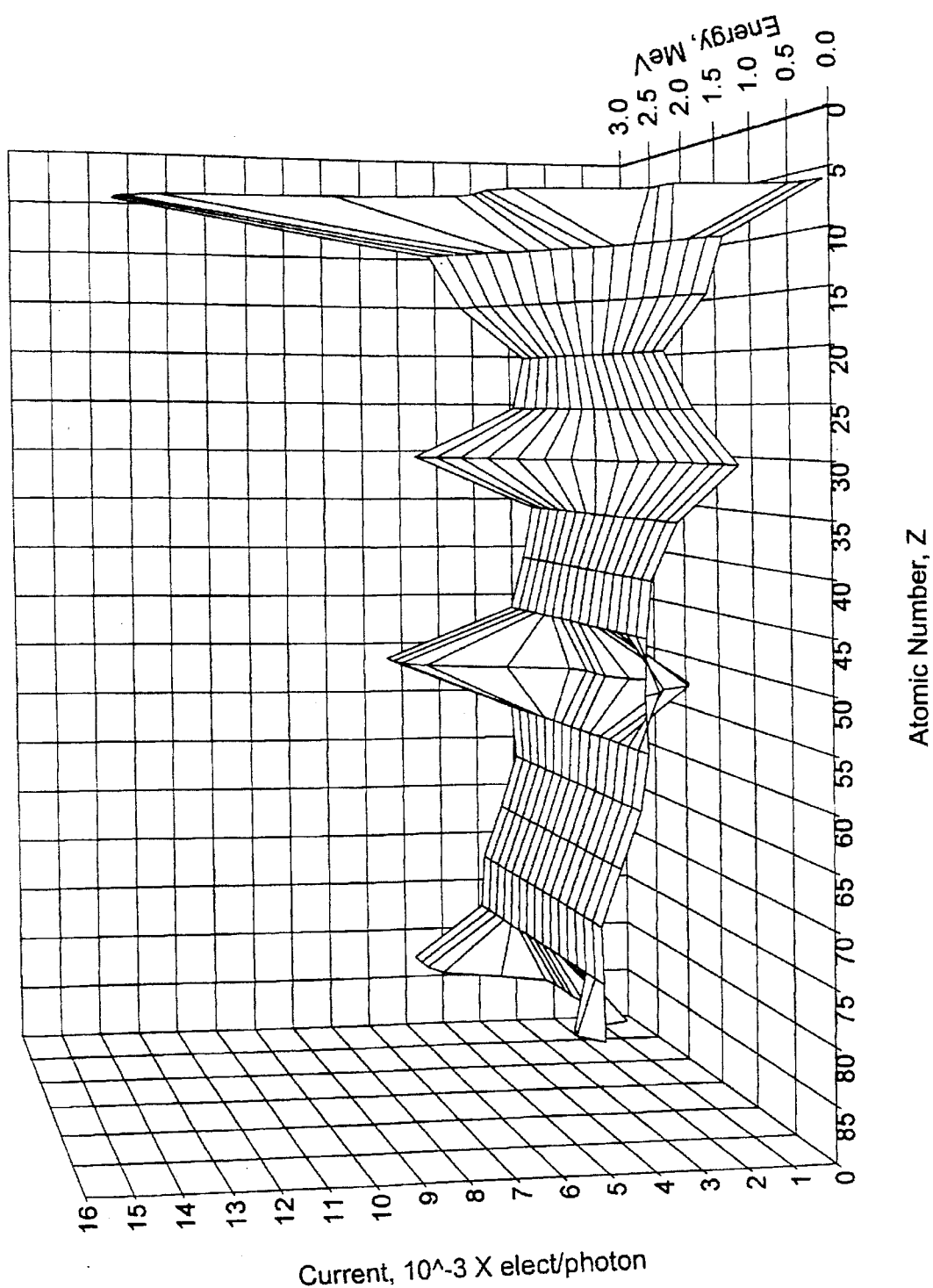
FIG. 7 is three dimensional plot of photo-Compton electrons emitted in the forward direction from various atomic number elements versus incident photon energy.
Figure 8:
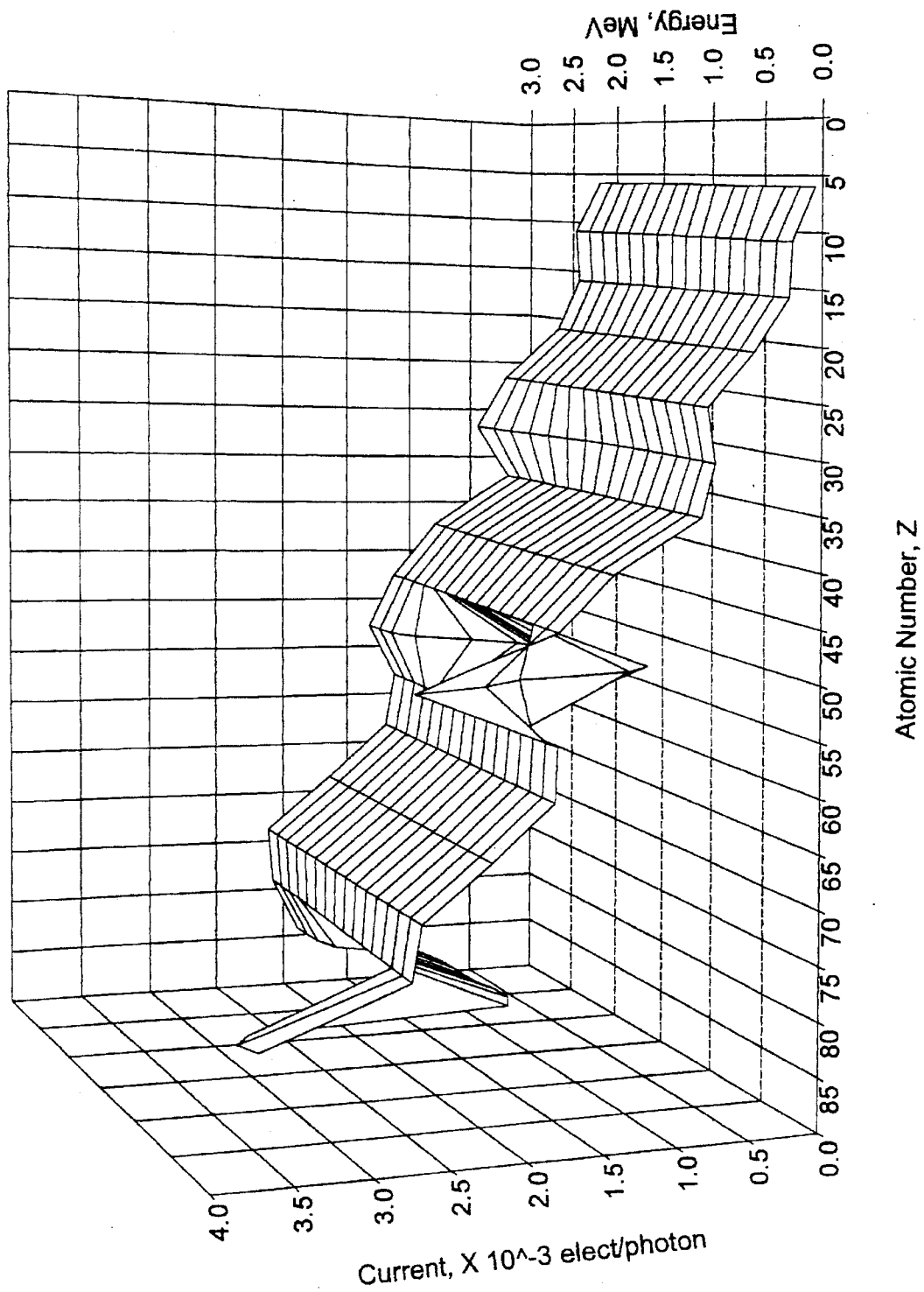
FIG. 8 is a three dimensional plot of photo-Compton electrons emitted in the backward direction from various atomic number elements versus incident photon energy.

FIGS. 7 and 8 are based on the published (T. A. Dellin et al., IEEE Trans. Nucl. Sci., NS-22 (6) (1975) 2549) data of photo-Compton electron emission yields for forward and backward generated electrons per incident photon on various atomic number materials and for previously calculated photon energies. One can see from FIGS. 7 and 8 that electron production versus photon energy and atomic number is not monodirectional in the present invention with energy or Z, but increases and decreases with variations in these parameters. Thus, it is not expected to monatonically increase or decrease with these parameters for the present invention. However, one skilled in the art could select from this data any number of combinations of differing Z materials and thicknesses to arrive at a device which would work for any number of applications.

There are two basic mechanisms that can produce this multi-directional type of response in the present invention, (1) attenuation by the lead emitter when it is between the source and the counter plus the emission of photo-Compton electrons, and (2) emission of photoelectrons when the counter is between the lead emitter and the source. The photo-Compton interactions vary with photon energy. For the higher photon energies, forward emission of photo-Compton electrons from the front emitter with insignificant attenuation combined with back emission from the back emitter produce the effective number of total counts. The maximum to minimum ratio will increase with thickness of the emitters until saturation takes place. The optimum signal is achieved when the thickness is approximately equal to the range of the electrons. For $^{60}$cobalt radiation, this thickness was experimentally determined to be about 3 mils (86.5 Mg/CM2) of lead. Five mils (144.1 Mg/CM2) of lead were used in the pancake counter measurements.

From this it is evident that a properly constructed GM tube with low and high Z materials or even a scintillation counter with the appropriate emitters can serve as a basic directional detector of radiation sources for intensities as low as twice the background (about 0.15 µGy h$^{-1}$). Moreover, these monitors respond directionally to a wide range of quantum energies, from 50 to 1250 keV. For the higher energy sources (i.e., ≧662 keV) photo-Compton electrons from high Z materials contribute to the directionality of these monitors, and for the lower energies the detector works due to the attenuation caused by the high Z material. A detector that works when exposed to cesium photons will also work for all other energies. For this purpose, a scintillation counter would provide the highest angular sensitivity.

Figure 2:
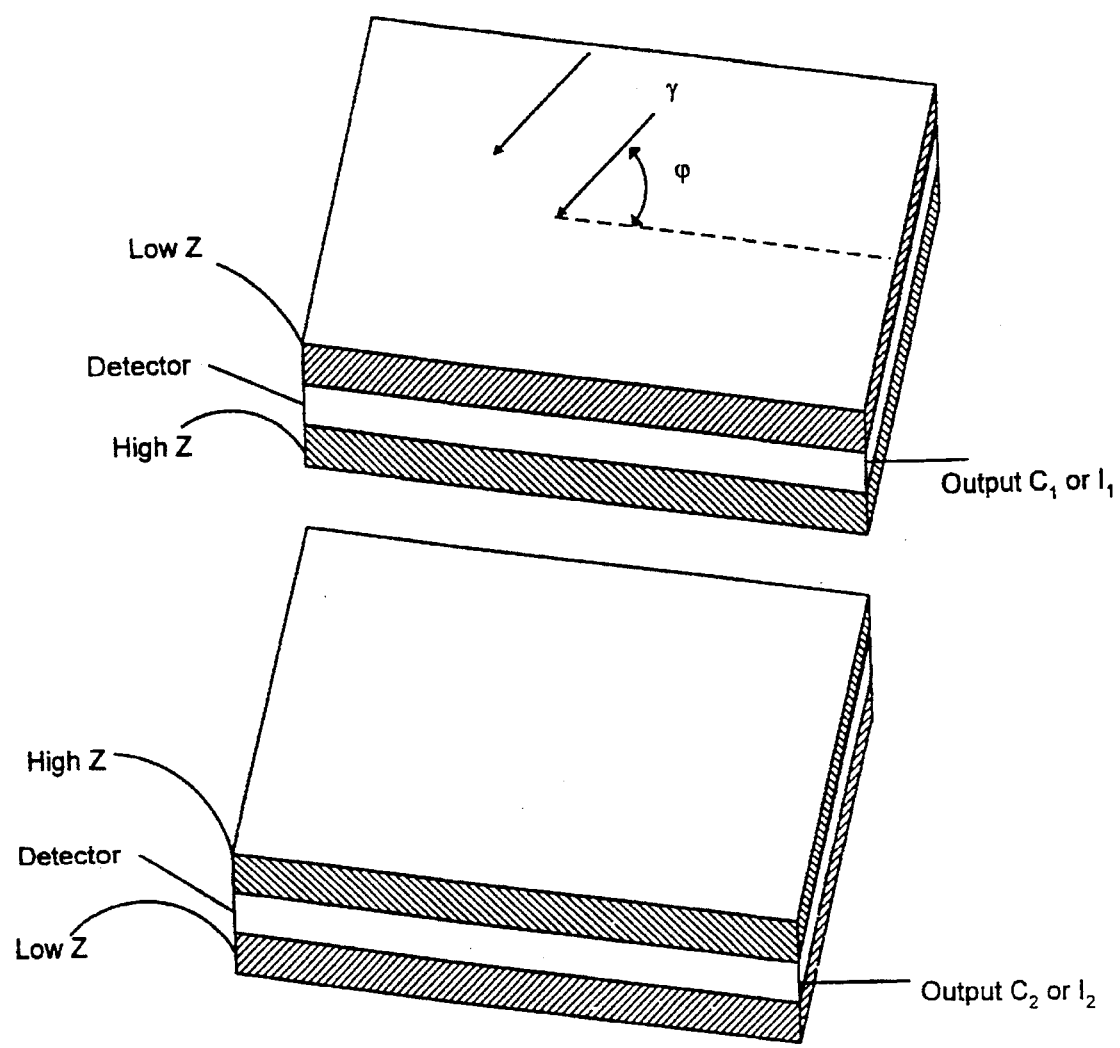
FIG 2 is a cross-section view of another embodiment of the present invention using a radiation detector layer such as a scintillation or solid state counter.

Now referring to FIG. 2, there is shown another embodiment of the present invention wherein a thin detector having a low Z is sandwiched between a layer of material having a low Z and a layer of material having a high Z. As shown, two such stacks are placed next to one another such that one stack has the high Z material on the top and the other stack has the high Z material on the bottom. As explained above, the thin detector layer must be thin compared with the applicable ranges of the photo-Compton electrons. For quantum energies of radiation, nominally gamma, greater than 0.6 MeV (i.e. where attenuation is insignificant), the number of electrons emitted from the surfaces of the two layers into the detector is greater when the gammas enter through the low Z layer than when they enter through the high Z layer. For lower quantum energies the emission effect is reversed, but now the incident gamma rays are attenuated more by the high Z layer than the low Z layer. Thus, the signal is again greater when the gamma rays enter through the low Z materials, compared to the signal when the gammas rays enter through the high Z layer.

If the gamma radiation enters the device parallel to the surface of the two detectors shown in FIG. 2, the output of both stacks are the same. Detector 1 produces an output, $C_1$, and detector 2 generates a corresponding output, $C_2$. Forming the absolute ratio of $R=(C_1+C_2)/(C_1-C_2)$, R approaches infinity when $C_1=C_2$. Therefore, the transition when $C_1=C_2$ occurs very sharply, thus making accurate determinations of the angle of incidence of the gamma radiation, as well as all types of radiation, possible. Different ways of achieving this will be discussed in relation to several different embodiments of the invention.

Figure 4:
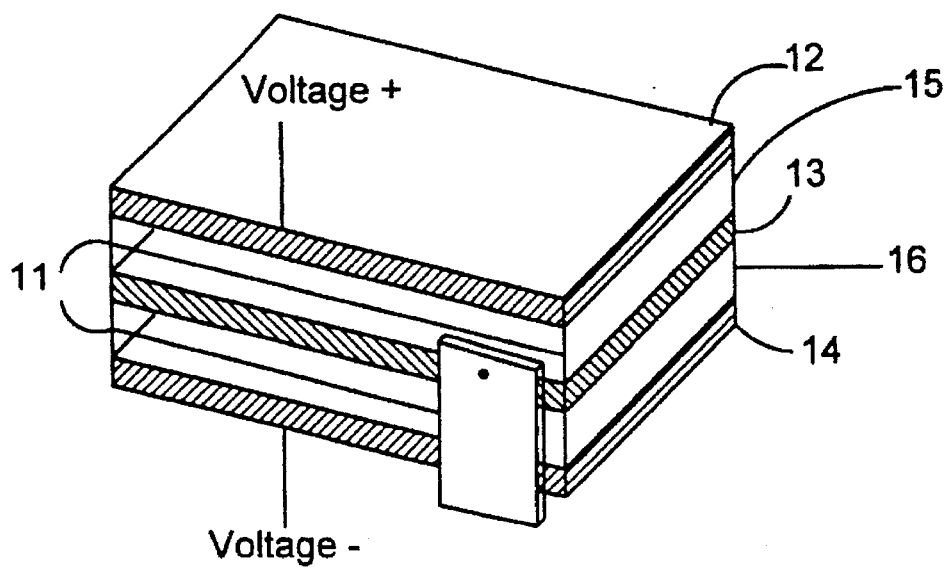
FIG. 4 is a perspective illustration of the present invention as an ionization chamber sensor.

FIG. 4 illustrates a sensor based on an ionization chamber designed to be used at higher, more intense quantum energies where the single event counters (GM and scintillator) saturate. The chamber consists of two subchambers 15 and 16 (see FIG. 1), one that is biased with a positive voltage (subchamber 15) and the other with a negative voltage (subchamber 16), relative to the common collector electrode of lead. Electrodes of low Z Lucite™ 12 and 14 that are covered with conducting plastic in both subchambers provide the other electrodes. Guard rings 11 should be utilized in the sensor design. The output current of the detector is the difference in the currents from the two subchambers. An electrometer (not shown), such as a Keithley electrometer, is used to measure the current signals from the electrodes.

Figure 9:
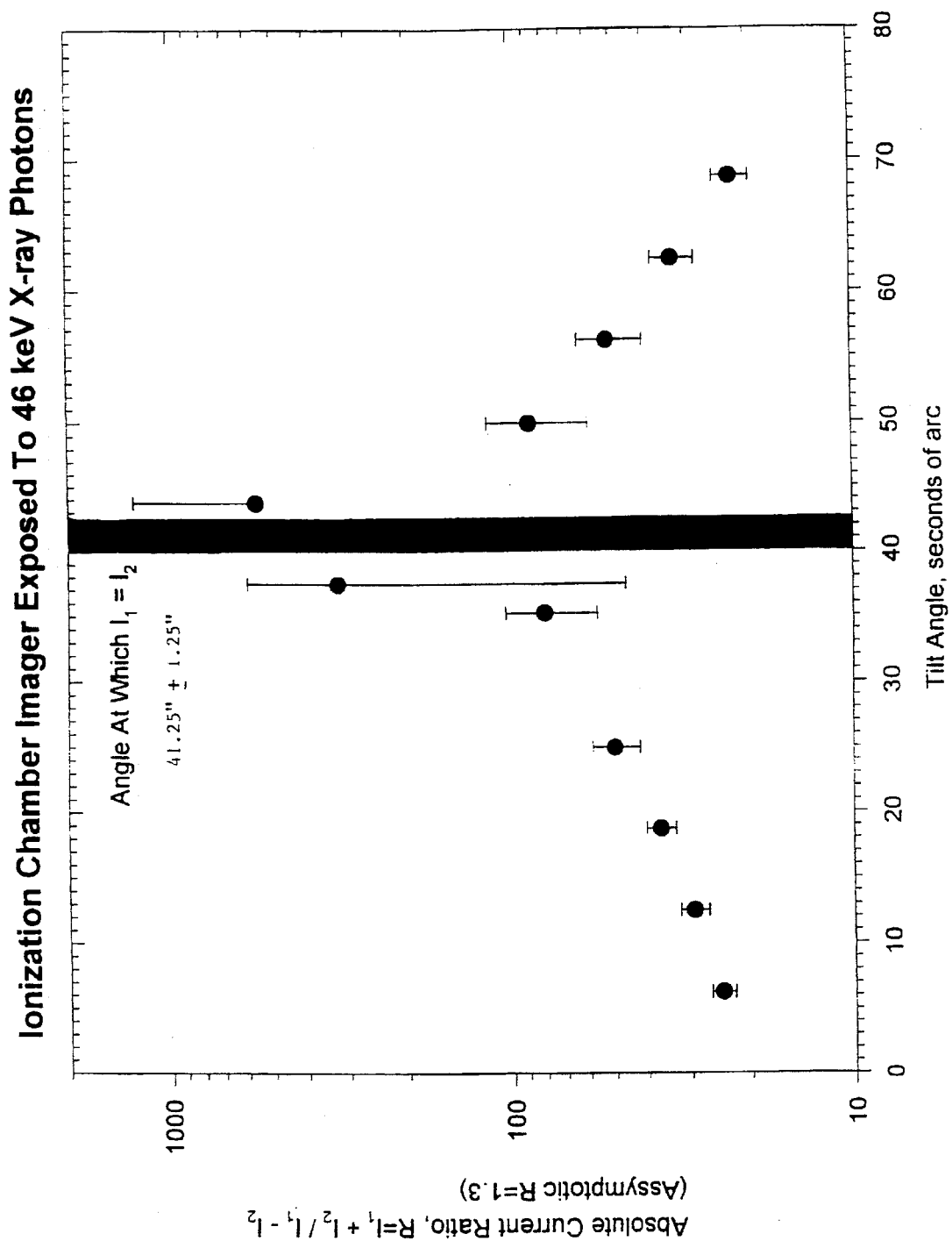
FIG. 9 is a graph of the absolute count ratio, $R = I_1 + I_2/I_1 - I_2$, of the ionization chamber sensor (FIG. 4), irradiated by x-rays of 46 keV energy versus tilt angle (photon incident angle) in units of seconds of arc.

FIG. 9 is a plot of the ratio for the output current of the ionization chamber device of FIG. 4 versus tilt angle (photon angle of incidence) when irradiated by 46 keV xrays. As shown in FIG. 9, the ratio $R=I_1+I_2/I_1-I_2$ displays a very sharp increase as the absolute difference in the ionization chamber output current $I_1-I_2$, approaches zero at a tilt angle (photon incident angle) of 41.25±1.25 seconds of arc. The black band in the plot represents the transition region where $I_1=I_2$. The error bars are estimates of the errors in the measurements (e.g. noise in Electrometer and Chart Recorder). This region where the singularity occurs is due to the sudden change of the photo-Compton emission currents as the photon incident angle approaches zero (relative to the plane of the electrodes) and the photons enter a long absorption path in either the Lucite™ or the lead electrodes. At the same time, the current either increases or decreases, depending on the direction of the imager's tilt relative to the incident photons. A decrease occurs when the direction of the tilting motion is such that the photons first hit the Lucite™, then the lead, and increase when the lead is hit first. Results similar to the data of FIG. 9 were also obtained when the ionization chamber sensor was exposed to 14 and 250 keV x-rays and $^{137}$Cesium gamma rays, respectively.

Figure 3:
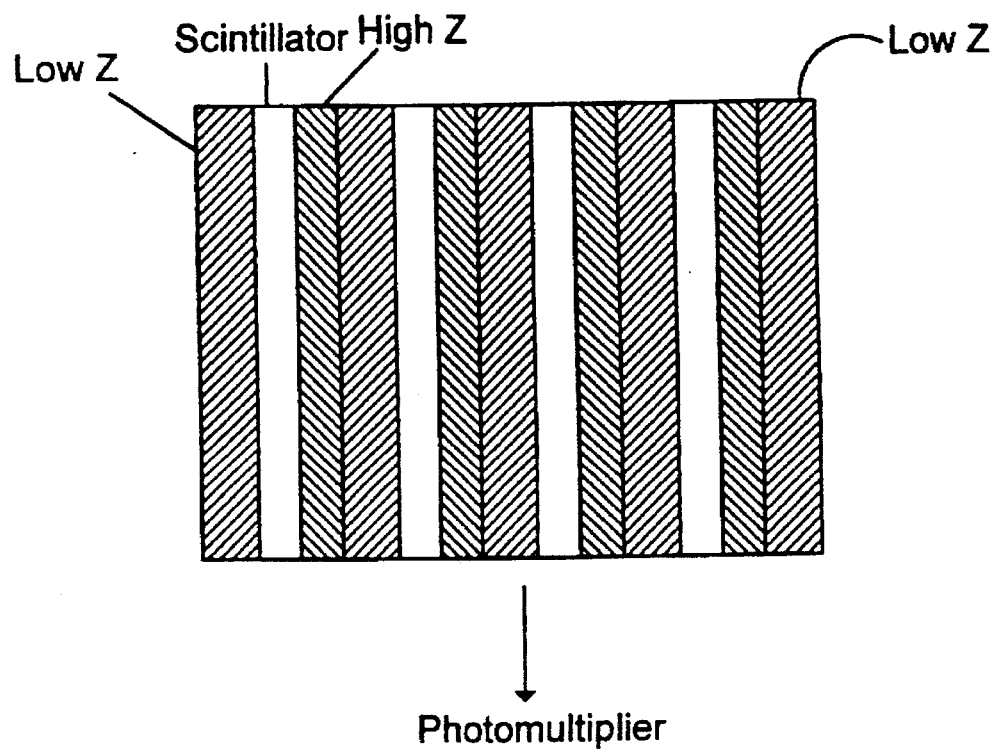
FIG. 3 is a cross-section view of still another embodiment of the present invention using several different layerings of differing Z material and detectors.

FIG. 3 is a perspective illustration of yet another embodiment of the present invention. As shown, the present invention may comprise multiple repeated layers of a low Z material layer, a scintillator detector layer, and a high Z material layer connected to a photomultiplier. In such an embodiment, the low Z material layer may be Lucite™ 3.1 mm thick; the scintillator detector layer (nominally, NE 102 anthracene loaded polyvinyltoulene) may be 0.25 mm thick; and the high Z material layer may be lead 0.13 mm thick. Of course, these dimensions are given merely as an example, as the thickness of the layers and the type of materials used may vary depending on the application. Given the description concerning the scattering effects of the different Z number materials above, one skilled in the art could devise any combination of materials and thicknesses for a myriad of applications.

Figure 10:
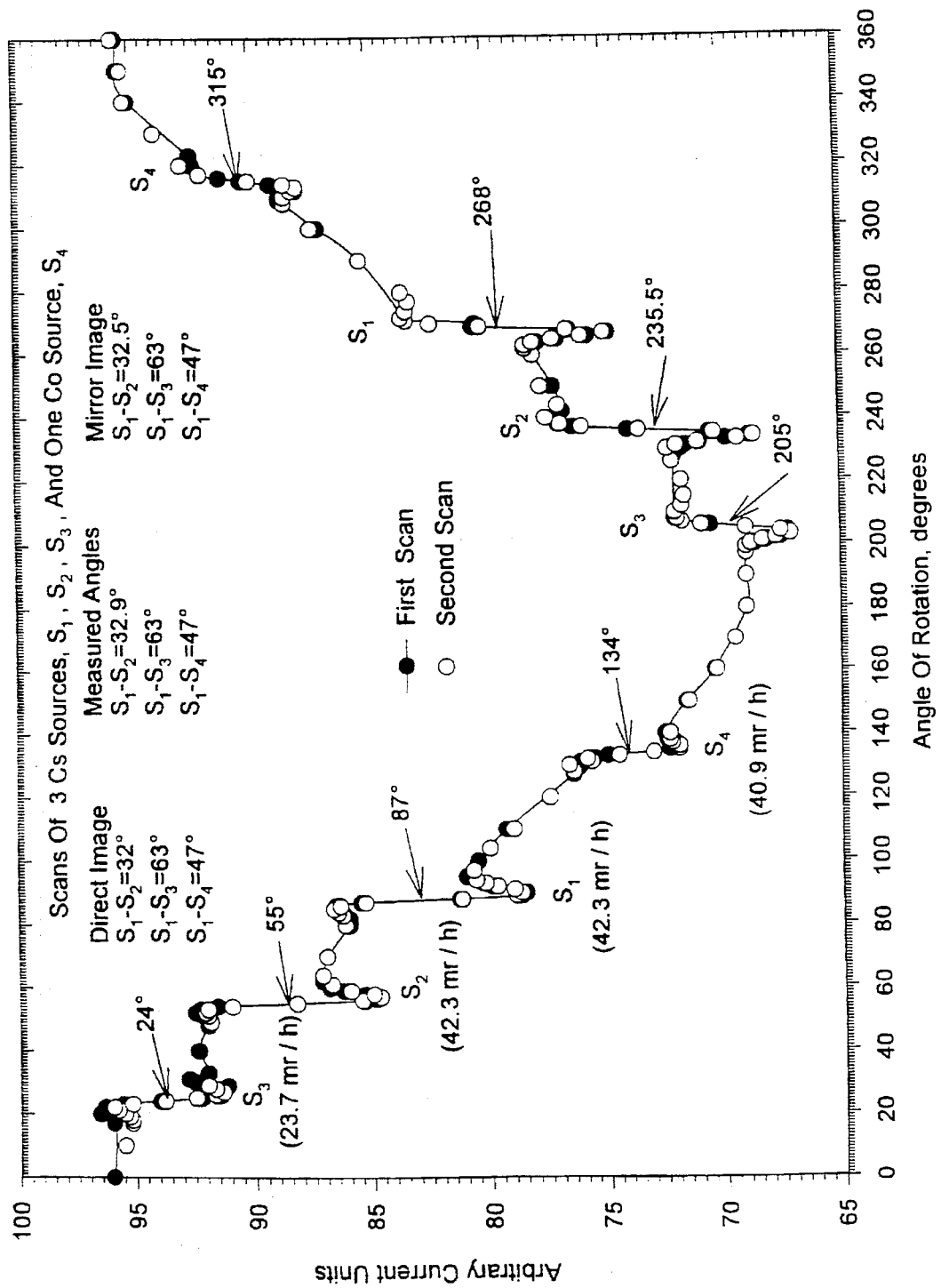
FIG. 10 is a graph representing the current output in arbitrary units versus angle of rotation (for two independent scans) of the device shown in FIG. 2, wherein the device was exposed to the beams of four independent $^{137}$Cs and $^{60}$Co sources and wherein four pairs of direct (angles <180° rotation) and mirror (angles of >180° rotation) images (two per source) are shown.

The different absorption and current emission properties of Lucite™ compared to lead generates two response patterns for each source. FIG. 10 shows the response patterns obtained with the scintillator detector of FIG. 3 rotating the detector through 360° in the beams of three $^{137}$Cesium sources and a $^{60}$Cobalt source for two independent runs. The response patterns for the angles from 0° to 180°, corresponding to the four sources, are arbitrarily called direct images. Images for angles >180° are arbitrarily called mirror images. The direct images show decreasing signals (negative derivatives) that occur when the direction of rotation allows the Lucite™ to be hit first then the lead. In contrast to these results, the mirror images show an increase in signal (positive derivatives) since now the lead is hit first. This is the same type of interaction and effect that was described above for the tilting motion of the ionization chamber.

The polar angles of each source can be simply obtained by drawing a line from the mean of the transition slope to the angle axis. These angles are shown on the plot in FIG. 10 for the four sources. The actual measurements of angles using a ruler and intensities measured with a dose rate meter for the sources are also indicated in the plot.

As shown in FIG. 10, the experimental values agree with the measurements within about a degree and the mirror images of each source are within a degree of 180° from the direct image. As is also clearly shown in FIG. 10, the higher gamma ray energies of cobalt (i.e. 1.17 and 1.33 MeV) compared to cesium photons (i.e. 662 keV) did not interfere with the detection and location of the cobalt or cesium sources.

Figure 11:
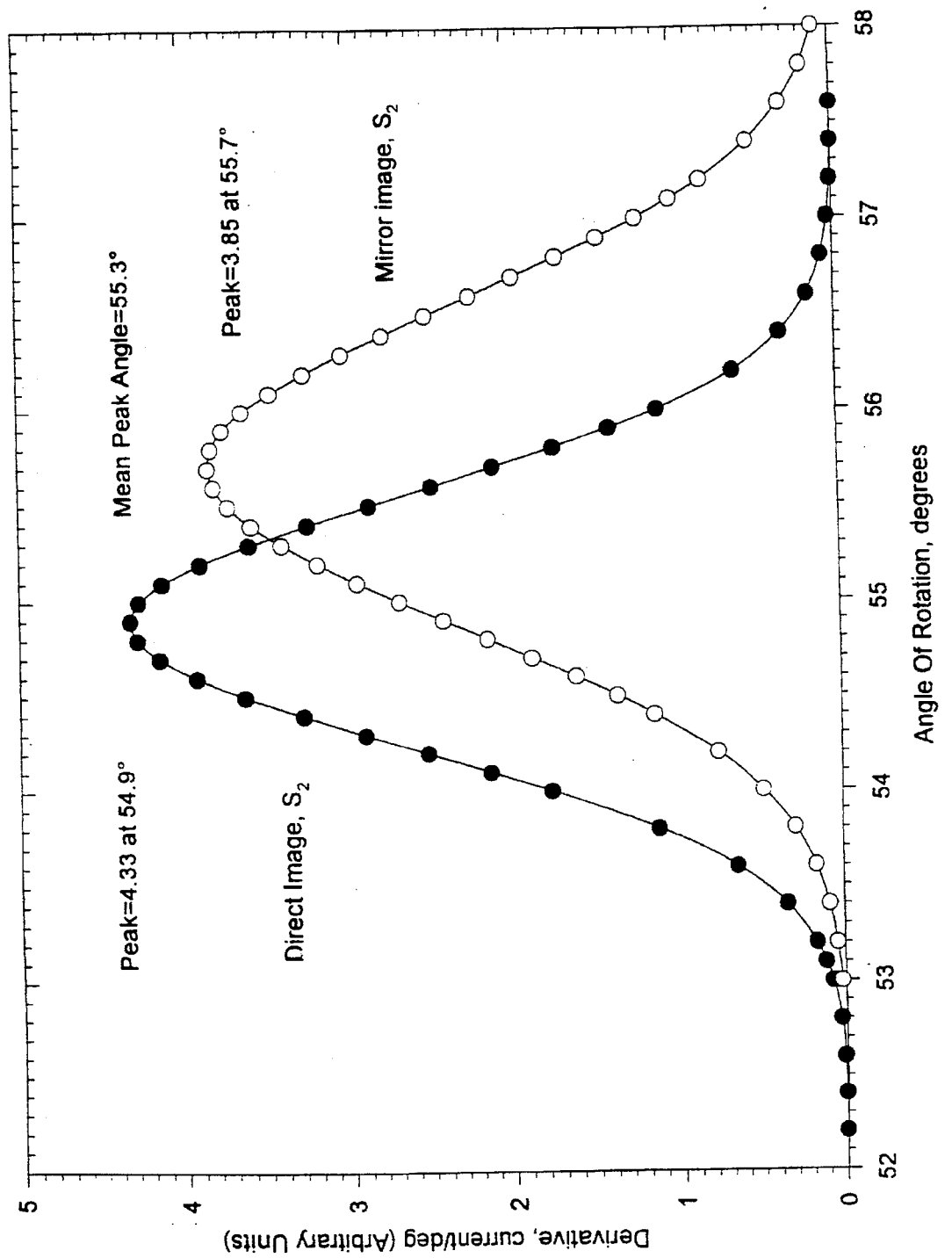
FIG. 11 is a graph of the first derivatives of the transition data for the direct and mirror (shifted 180°) images from the scan data of FIG. 10 corresponding to $S_2$ ($^{137}$Cs source two) versus angle of rotation.
Figure 12:
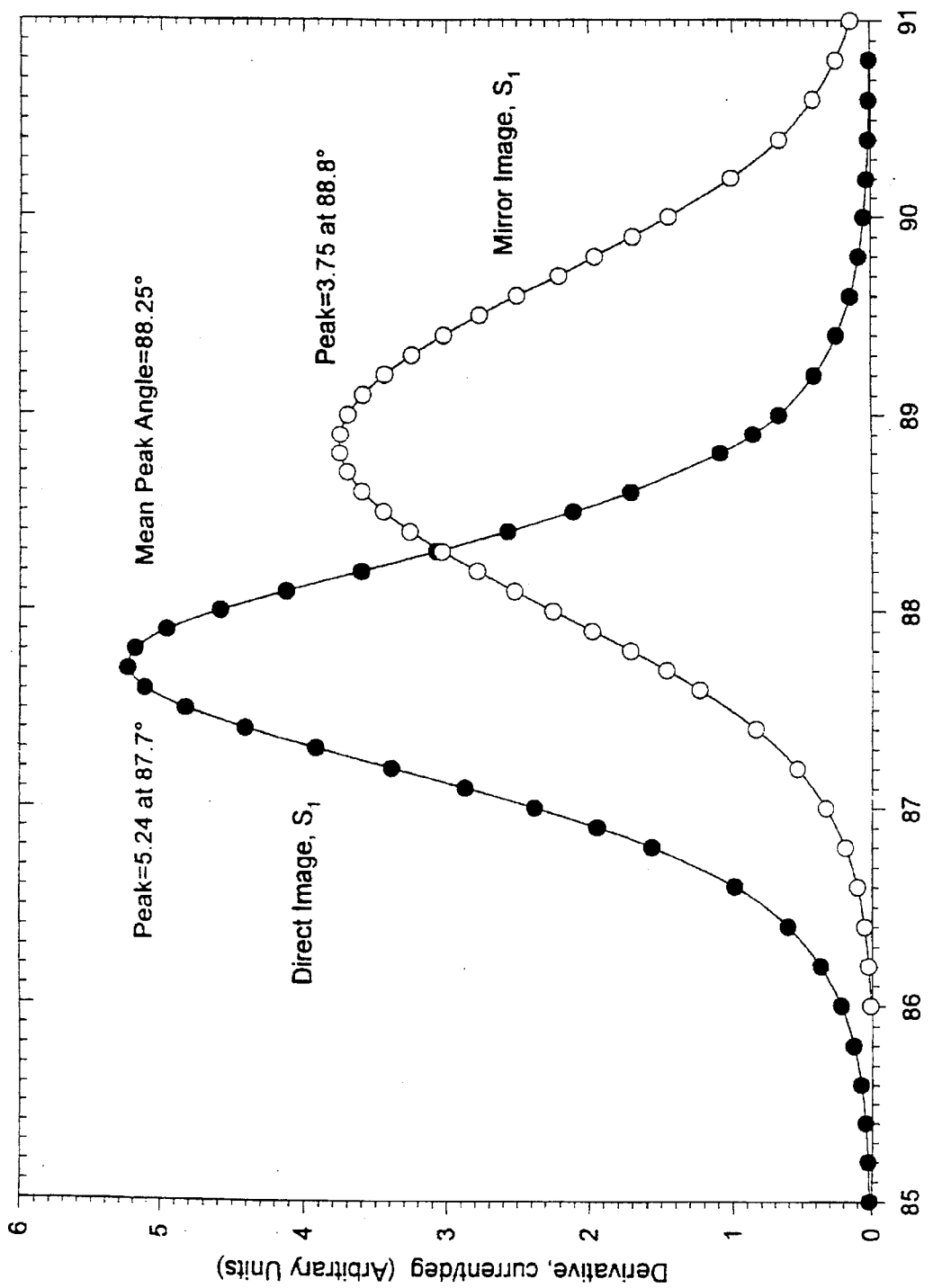
FIG. 12 is a graph of the first derivatives of the transition data for the direct and mirror (shifted 180°) images from the scan data of FIG. 10 corresponding to $S_1$ ($^{137}$Cs source one) versus angle of rotation.

There are two other methods to determine, from the scans, the polar angles of the sources relative to the detector and each other. One of these is to calculate the first derivative of the transition region of the direct and mirror images. This technique is illustrated by FIGS. 11 and 12 where the derivatives of the data for the direct and mirror images that were obtained from FIG. 10 for sources $S_2$ and $S_1$ are displayed. The locations of these sources are given by the mean of the angles where the maxima occur for each pair of direct and mirror images. The difference in the mean values of the peak angles for the sources indicates the angle of separation from all the other sources. For example, $S_2$ is located 32.95° away from $S_1$. In contrast to this method, the angles may be obtained by simply dropping a line from the mean of the transition regions of the images for sources and calculating the difference in the mean values of the peak angles for the different sources.

Figure 16A:
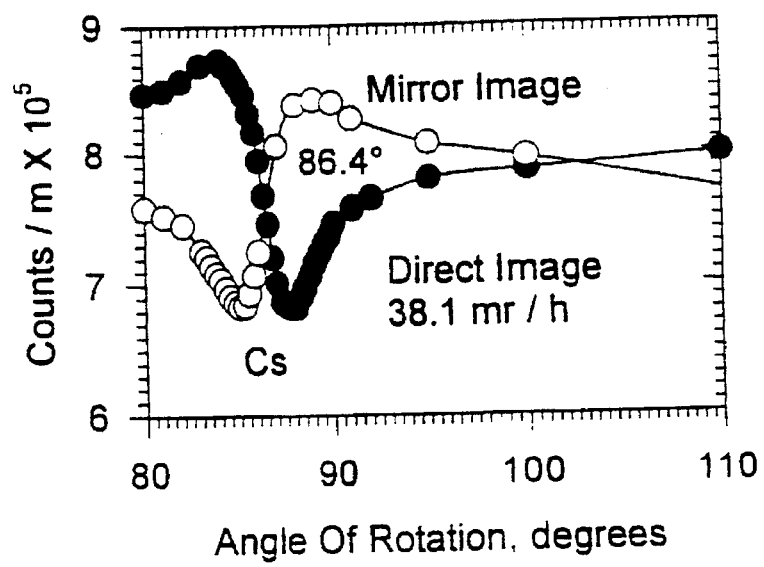
FIGS. 16a and 16b graphically illustrate another method to determine the source angles from the set of scan data obtained from FIG. 15 wherein pairs of mirror images for the cesium and x-ray sources were shifted 180° and plotted so that they intersect with their corresponding direct images and wherein the absolute minima of the image pairs were normalized to equal amplitude (the points of intersection are the polar angles of the sources relative to the detector)
Figure 16B:
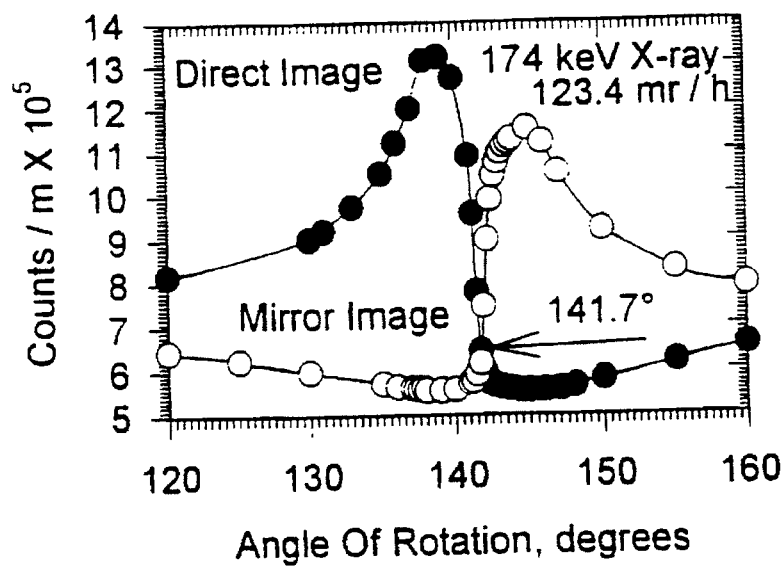

A third approach to determine angles from the scan data is to separate the direct and mirror images then shift the mirror images by 180° and construct a plot showing the intersection of the corresponding pairs of images. This method is illustrated by the plots of FIGS. 16a and 16b that are deduced from the x-ray and cesium scan data. The point of intersection of each pair of images is the angular location of the source. In the discussion of the ionization chamber results, it was pointed out how the current null or number of counts makes the algorithm ratio of $R=I_1+I_2/I_1-I_2$ or $R=C_1+C_2/C_1-C_2$ approach infinity. The intersection of the mirror and direct images shown in FIGS. 16a and 16b are the values where $I_1=I_2$ or $C_1=C_2$.

Figure 15:
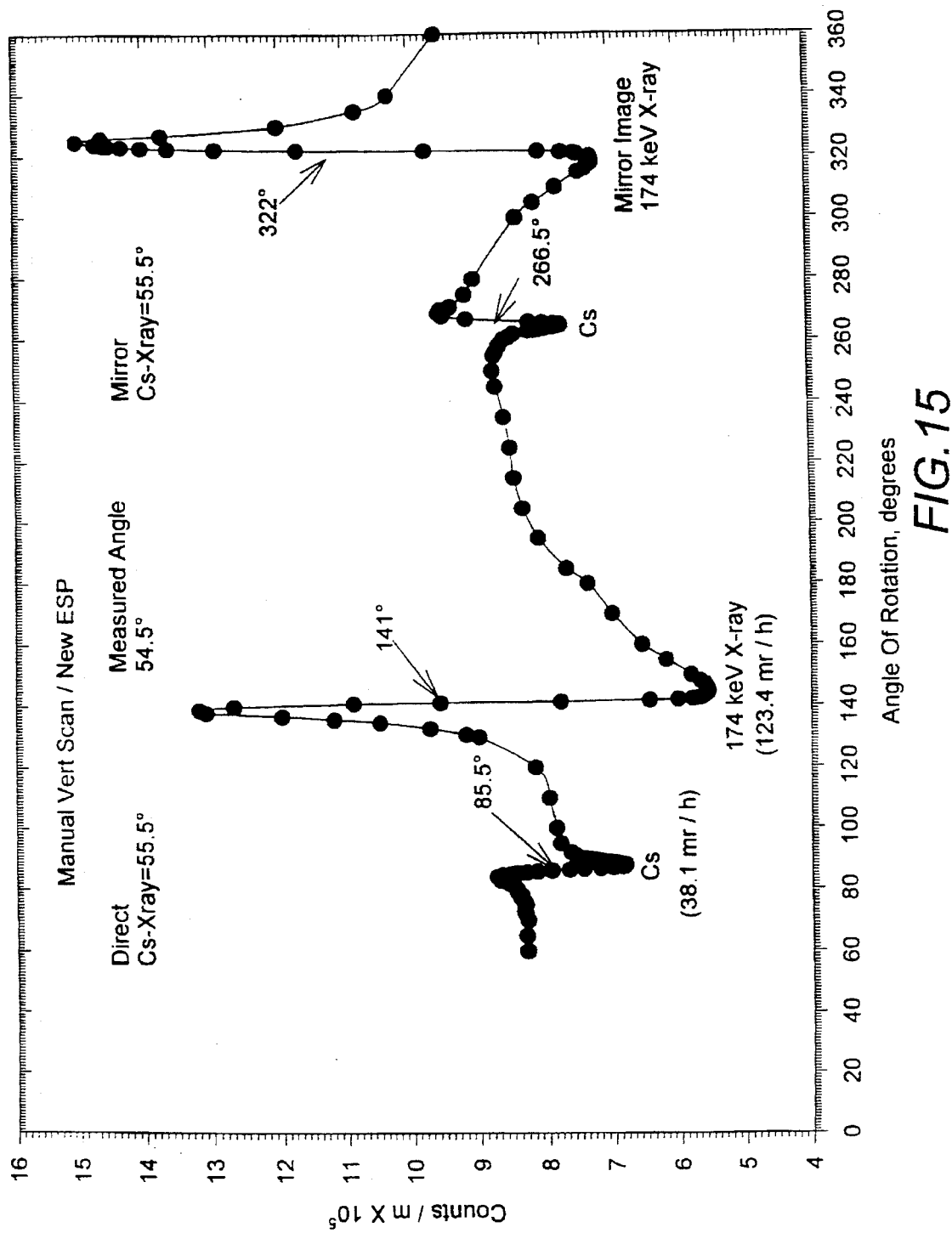
FIG. 15 is a plot of the scan data taken using the detector of FIG. 2 wherein two sources having significantly different energies, namely, $^{137}$Cs emitting 662 keV photons and x-rays of 174 keV.

Thus, this method of locating sources can also be applied to find graphically a source location when two sensors are simultaneously rotated through 180° as in the case of the ionization chamber (two sub-chamber detectors) or the GM (double pancake counters) imagers. It can be seen from FIGS. 16a and 16b that the location of the $^{137}$Cs source relative to the x-ray source, namely 55.3°, is about the same value as shown in FIG. 15, 55.5°. Thus, either method is in good agreement with the actual measured angle.

Figure 14A:
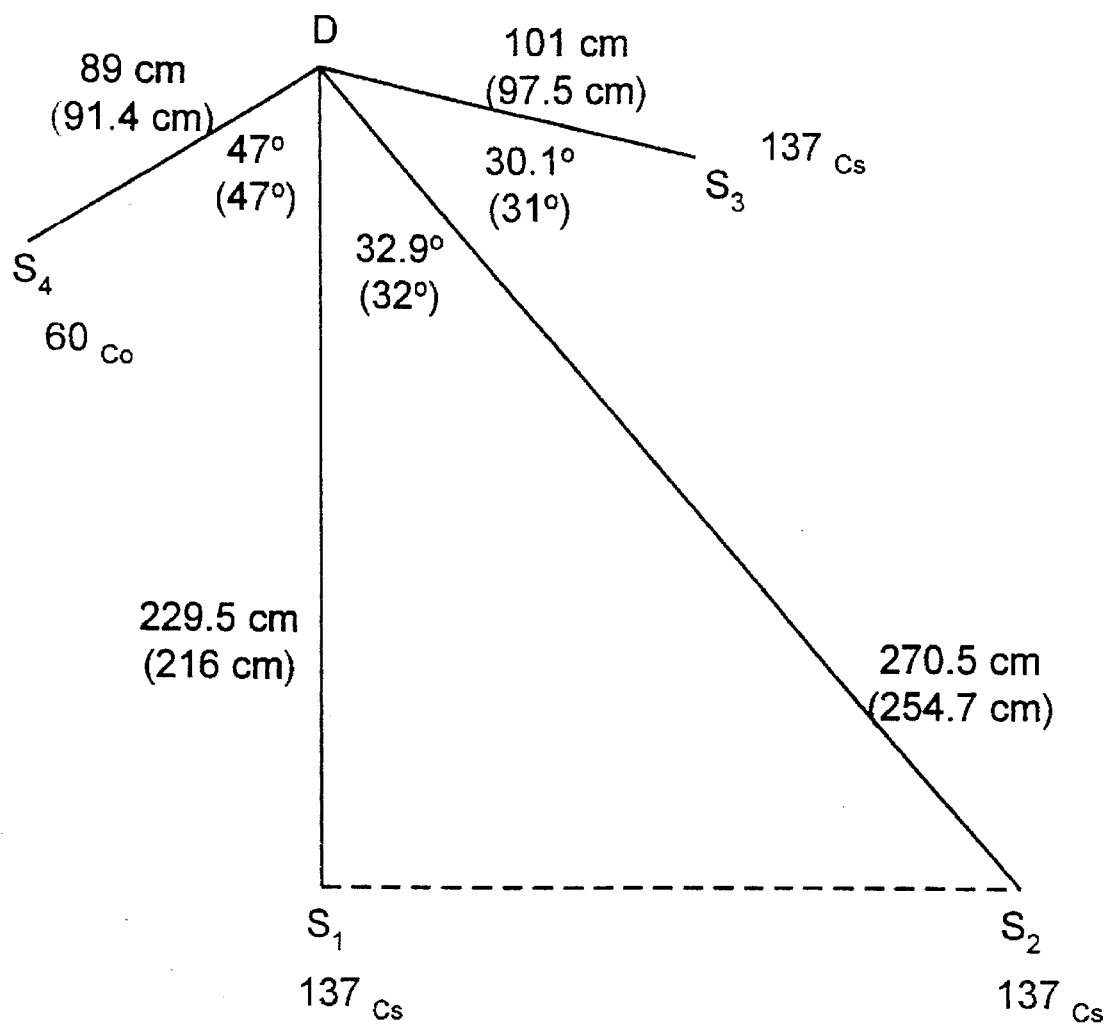
FIGS. 14a and 14b are drawings of the physical layout and geometry of the sources used to obtain the graphs of FIG. 10 and FIG. 13.
Figure 14B:
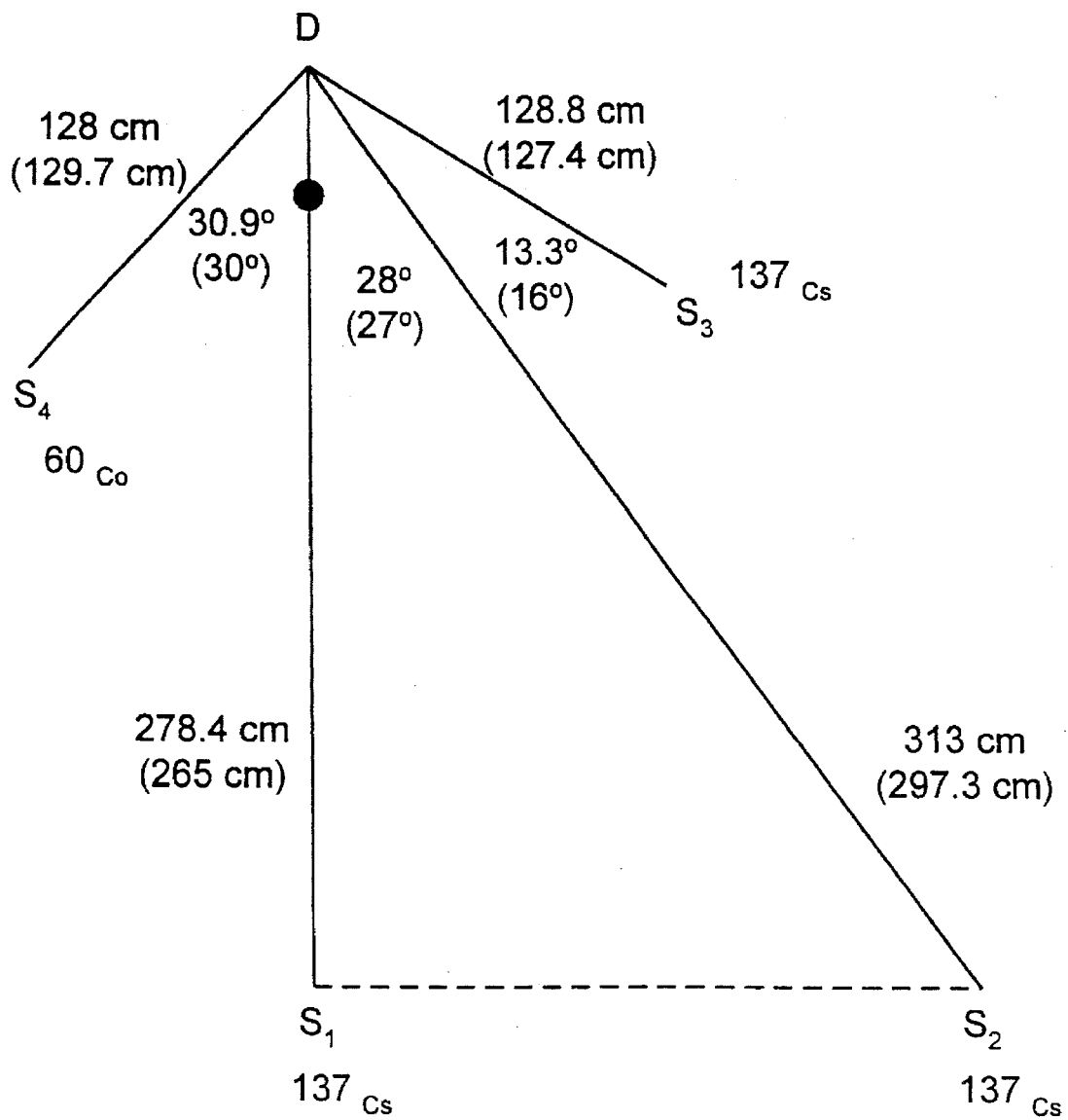

FIGS. 14a and 14b illustrate the above described experimental layout, showing the four sources and the SC imager located at the two scan positions, 48.9 cm apart. The experimental (in parentheses) and measured angles and distances are identified in FIGS. 14a and 14b. The agreement of measured and experimental distances and angles is good.

Moreover, the present invention can determine the relative intensities of the sources. As shown in FIGS. 11 and 12, the ratio of either the direct or the mirror peaks of any two sources are close to the actual ratio of source intensities. For example, the ratios for $S_1$ and $S_2$ are 1.2 and 1.0 for the direct and mirror ratios, respectively, whereas the measured intensity ratio is 1.0. The ratio of the peak-to-peak amplitudes of the transition regions at the source location are also proportional to the cesium source intensities.

Although the cobalt source ($S_4$) intensity (as measured by a dosimeter) is about twice that of $S_3$ (cesium) and about the same as the intensities of $S_1$ (cesium) and $S_2$ (cesium), the peak-to-peak transition regions of the scan are not proportional to the intensity ratios for cobalt compared to cesium. For example, using the mean values for the two sets of data and the two image types, $S_1/S_2=1$ for the experimental peak ratio as well as the ratio for the measured intensities. However, for $S_4/S_3$, the peak ratio is 1.06 whereas the actual intensity ratio is 1.7. This disagreement is due to the energy dependence of the sensor. The higher intensity of the cobalt gamma rays (i.e. 1.17 and 1.33 MeV) generates larger numbers of pulses, but they produce smaller light flashes in the scintillator due to less absorbed energy (i.e. the linear energy transfer, $dE/dx$ is smaller for the higher energies) and consequently, less photomultiplier output current is produced.

Figure 13:
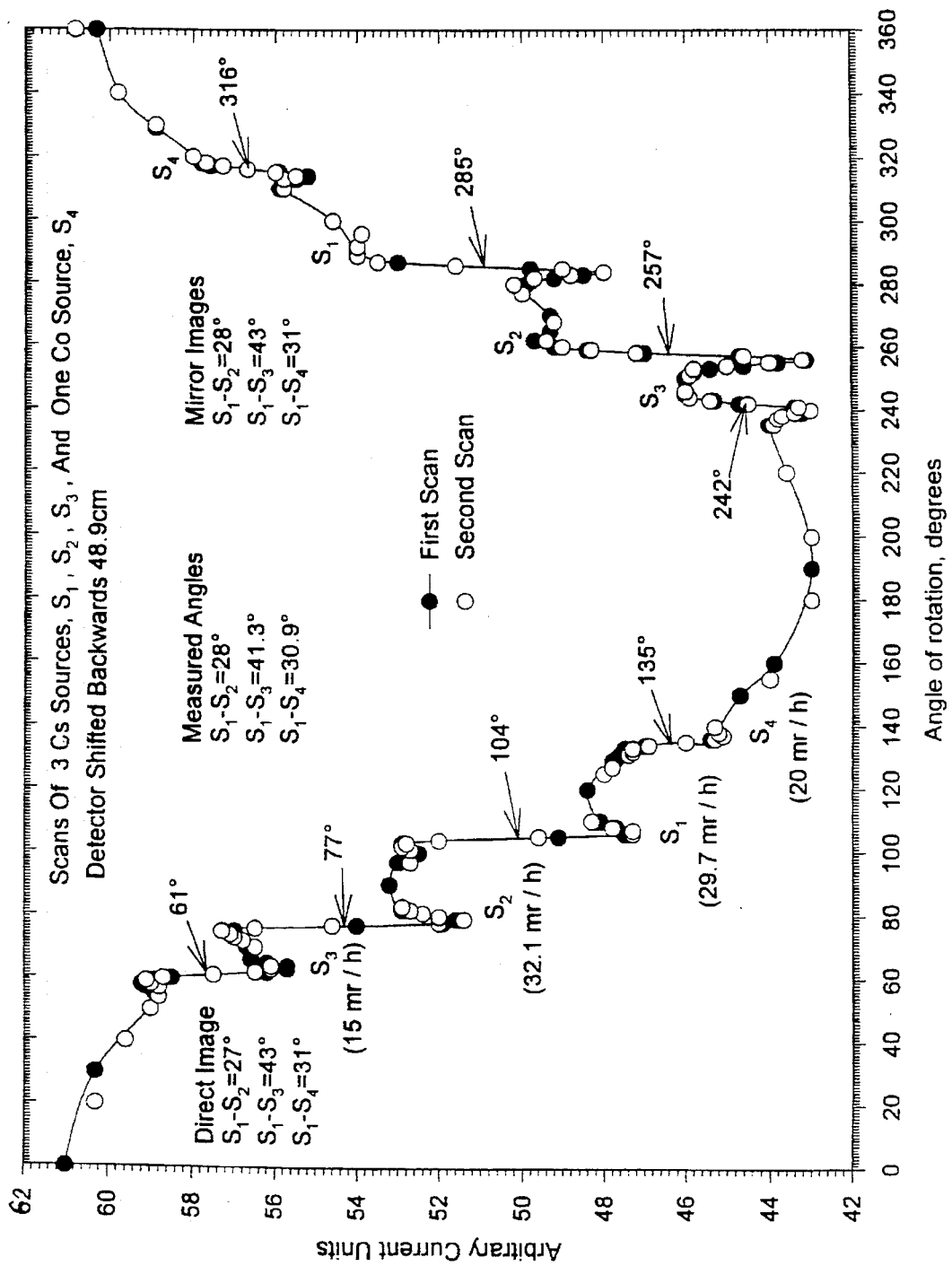
FIG. 13 is a plot of the patterns generated by the scintillator based detector (FIG. 2) in two independent scans of the same four sources from FIG. 10 but with the sensor moved away from $S_1$ (48.5 cm along the line from the source to the detector) wherein the measured polar angles of each source relative to $S_1$ and the corresponding experimental scan angles are shown.

The intensity of the unknown sources and the distance from the detector to each of the sources can be determined by moving the detector a known distance away from its original position at some angle relative to the line from source to detector. Another method that is experimentally simple to apply is to move the sensor away from $S_1$ along the original line from this source to the sensor. FIG. 13 contains the results for two scans of the four fixed sources but with the new location of the detector. Again, the reproducibility is good for the two independent scans. The new scan angles for each source and their measured angles are in good agreement as shown in the FIG. 13.

The experiments with four sources have demonstrated the capability of the sensor to scan a distribution of sources, including one with an energy twice that of the other three sources and also to determine distances from sensor to sources. However, the present invention can also scan two different sources with very dissimilar energies and accurately locate the sources. To show this, a scan of a $^{137}$Cs source and a x-ray source was performed with the SC sensor. FIG. 15 shows a 360° scan of a $^{137}$Cs source (662 keV gammas) and x-rays of 174 keV effective energy. The 174 keV x-ray intensity measured at the detector was about 3.2 times that of the $^{137}$Cs source. The experimental value was about 4.2 times as determined from the peak-to-peak values in the transition regions. The disagreement of measured ratio to the scan value is caused by the increase in attenuation at the lower photon energy of 174 keV as well as the energy dependence of the sensor. The experimental angle between $^{137}$Cs and the 174 x-ray sources is 55.5° compared to the measured value of 54.5°. Thus, the agreement is within a degree for either type of image. This experiment was repeated at a lower x-ray energy of 46 keV with similar accuracy in angular locations.

As described above, the present invention can be built with a very high angular resolution and a $4\pi$ solid angle of acceptance. The limiting resolution and value of the count or current ratio, R, is determined by the counting statistics and the accuracy of current and angle measurements. The three different sensors, namely, an ionization chamber, Geiger-Mueller, and scintillator devices, described above, may be used for any number of different applications according to the present invention. All of these detectors operate in a counting or current mode and all display a step function response when exposed to gamma or x-ray photons while rotating in a field of radiation. As described above, an experimental angular resolution of 1.25 seconds of arc was achieved with the ionization chamber sensor operating as a null detector. The measurements discussed indicate that the present invention, depending on which type of counter used, works over an energy range of 14 to 1250 keV. Calculated photo-Compton emission currents suggest that the devices will work for higher gamma energies up to at least 20 MeV. The intensity sensitivity of these three device types cover a range of intensity values from 1.0 megarads/hour down to background (typically 15 μrads/hour). In region where the intensity of the background may be lower and its energy higher (e.g. outerspace) the scintillator sensor is capable of detecting an intensity of a few photons/cm$^2$–s and locating the source.

The present invention may also be used as an imager of radiation sources directly or even reflected radiation from irradiated objects. The principles of this imaging capability are explained below as a derivation of the response of the sensor to arbitrary distributions of radiation directions.

Figure 17:
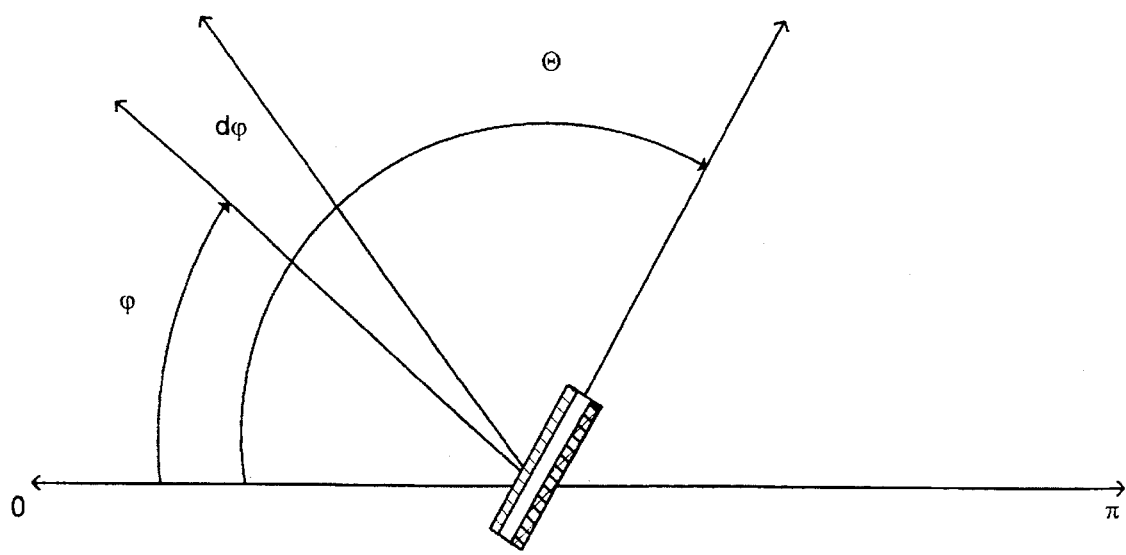
FIG. 17 illustrates the angular references associated with a method to calculate the angular dependence of radiation intensity incident to the present invention.

Now referring to FIG. 17, assume that radiation, having an angular distribution, $\mathcal{I}(\phi)$, arrives from the upper plane of rotation as shown in FIG. 17, that is through angles between 0 and $\pi$. Thus, the expression for the detector output, $\sigma$, is:

$$d\sigma(\theta,\phi) = k\, \mathcal{I}(\phi) S(\theta - \phi) d\phi,$$

where $\theta$ and $\phi$ are the angular relations of radiation to the detector as shown in FIG. 17, S is the detector sensitivity, and k is a proportionality factor. Accordingly, this leads to the integral equation, $$\sigma(\phi) = k \int_0^\pi \mathcal{I}(\phi) S(\theta - \phi) d\phi.$$

where S is the kernel and $\mathcal{I}$ is the desired distribution. According to the principle of operation of the detector (as explained above):

$$S(\theta - \phi) = \begin{matrix} C_1 (\text{constant}) \text{ for } \theta - \phi < 0 \\ C_2 (\text{constant}) \text{ for } \theta - \phi > 0 \end{matrix}$$

Thus, by defining a function $L(\theta)$ where $dL(\theta)/d\theta = \mathcal{I}(\theta)$, the above integral equation can be solved analytically as:

$$\sigma(\theta) = \frac{C_2}{k} \int_0^\theta \mathcal{I}(\phi) d\phi + \frac{C_1}{k} \int_\theta^\pi \mathcal{I}(\phi) d\phi =$$

$$\frac{1}{k} [C_2 L(\theta) - C_2 L(0) + C_1 L(\pi) - C_1 L(\theta)].$$

Since the radiation arrives only from the upper plane of rotation $L(0)=0$ and $L(\pi)=D$ (total dose which is a constant). Therefore, $$\sigma(\theta) = L(\theta)\frac{C_2 - C_1}{k} + \frac{D}{k} \text{ or } L(\theta) = \left[\sigma(\theta) - \frac{D}{k}\right]\frac{k}{C_2 - C_1}.$$

Since $dL(\theta)/d\theta = \mathfrak{I}(\theta)$, then $$\mathfrak{I}(\theta) = \frac{k}{C_2 - C_1}\frac{d\sigma(\theta)}{d\theta}.$$

Thus, the distribution of incident intensities as a function of the incident angle on the plane perpendicular to the axis of rotation of the detector is proportional to the first derivative of the observed output of the detector.

When radiation is delivered only from the bottom semicircle in FIG. 17, the derivation of $\mathfrak{I}(\theta)$ is the same except that $$\frac{k}{C_2 - C_1}$$

is now replaced by $$\frac{k}{C_1 - C_2} = -\frac{k}{C_2 - C_1}.$$

Therefore, when radiation is delivered through the entire plane of rotation, the intensity distribution will be the sum of the contributions from the entire plane:

$$\mathfrak{I}(\theta) \propto \left|\frac{d\sigma(\theta)}{d\theta}\right|.$$

This holds true except for cases where an abrupt change of intensity occurs at an angle close to parallel incidence to the detector plane. This is the case when $\mathfrak{I}(\theta)$ is a delta function (a point source). In these cases, the radiation travels a long path through the high Z plate or through the low Z plate, resulting in considerable absorption of the incident radiation. This results in an undershoot or in an overshoot near the transition point as is visible in the experimental results shown below.

Figure 18:
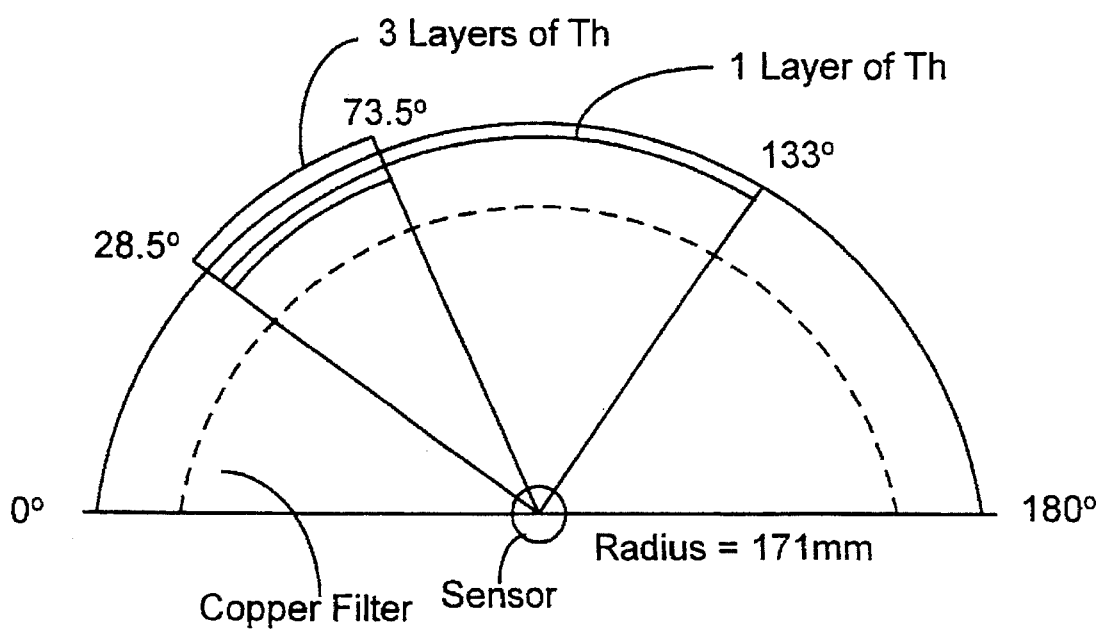
FIG. 18 illustrates an experimental layout showing how the present invention is useful as an imager.
Figure 19:
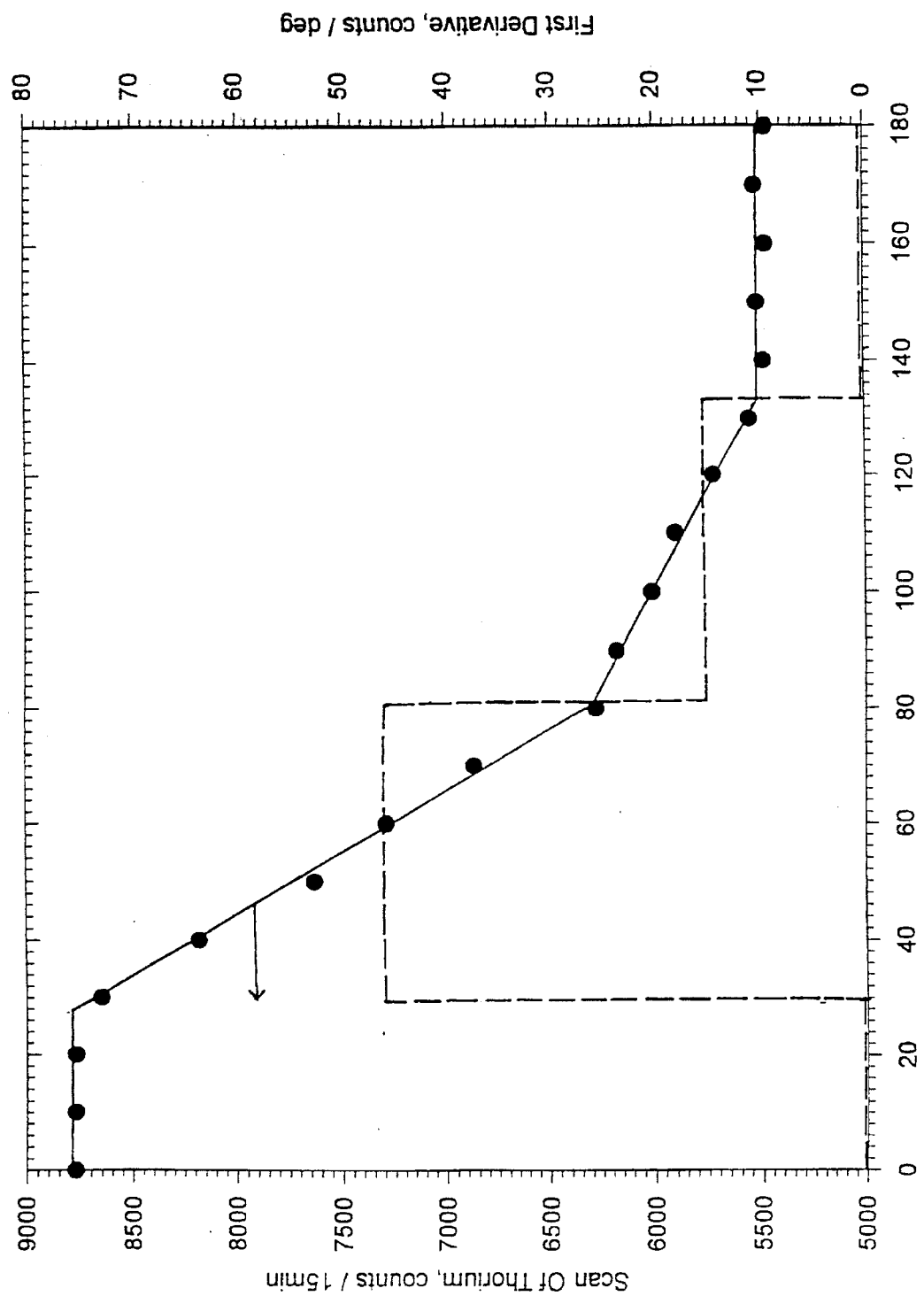
FIG. 19 graphically illustrates the results obtained using the experimental layout of FIG. 18 and resultant calculation showing that the present invention is useful as an imager.

To verify the usefulness of the present invention as an radiation imager, a semicircular copper filter/support was formed as shown in FIG. 18. A semicircular structure was chosen for ease of interpreting the dam. Because the present invention will be rotated in a circular fashion, the curved structure will theoretically be plotted as flat. The copper support covered 180° with a radius of 171 mm and a radiation detector/imager according to the present invention was centered in the copper support as shown. Two layers of Thorium (Th) were attached to the copper support beginning at 28.5° and ending at 73.5° as measured from the detector/imager. A third layer of Th was also attached to the copper support, but this third layer started at 28.5° and ended at 133° as measured from the detector/imager. The detector/imager was rotated within this structure and the total number of counts from the detector/imager was plotted against the angle of rotation. This plot is shown in FIG. 19. As clearly depicted, the slope of the plot of number counts/angle changes at each of the transition points where the layers of Th start and end. Moreover, the degree of slope change from the section where there were three layers of Th is three times the slope of where the single layer of Th was. Therefore, the present invention is capable of imaging radiation sources as a function of the intensity of the source in three dimensions.

The dashed line of FIG. 19 represents the first derivative of the plot of the solid line taken directly from the data. This first derivative clearly shows the depth/intensity of the three layers of Th as compared to the single layer of Th.

It is to be understood that other features and modifications to the foregoing detailed description are within the contemplation of the invention which is not limited by this description. As will be further appreciated by those skilled in the art, any number of configurations of sandwiching a radiation detector and any number of combinations of detectors and differing Z materials and thicknesses can achieve the results described herein. Accordingly, the present invention should not be limited by the foregoing description, but only by the appended claims.

What is claimed is:

1. A directional radiation detector comprising:
    means sensitive to radiation having at least a first and second side;
    a first region of material having a first atomic number and disposed on the first side of the means sensitive to radiation;
    a second region of material having a second atomic number which is different from that of the atomic number of the first region of material and disposed on the second side of the means sensitive to radiation;
    wherein the first and second atomic numbers of the first and second regions are sufficiently different such that when radiation is incident to the detector, there is a difference in forward and backward emissions of electrons between the first and second regions;
    means to detect a signal from the means sensitive to radiation.

2. The detector of claim 1 further comprising means to rotate the detector.

3. The detector of claim 2 wherein the means sensitive to radiation is a Geiger Muller counter.

4. The detector of claim 3 wherein the Geiger Mueller counter has at least two sides which are permeable to radiation.

5. The detector of claim 4 wherein the at least two sides of the Geiger Mueller counter are thin.

6. The detector of claim 2 wherein the means sensitive to radiation is a scintillation counter.

7. The detector of claim 2 wherein the means sensitive to radiation is a solid state counter.

8. The detector of claim 2 wherein the first region of material is made of plastic and the second region of material is made of high atomic number material.

9. The detector of claim 2 further comprising means to calculate the direction of a maximum number of signals from the means to detect a signal.

10. A directional radiation detector comprising:
    at least two means sensitive to radiation, each means having at least a first and second side;
    at least two regions of material having a first atomic number and disposed on each of the first sides of the means sensitive to radiation;
    at least two regions of material having a second atomic number which is different from that of the atomic number of the first region of material and disposed on each of the second sides of the means sensitive to radiation;
    wherein the first and second atomic numbers of the first and second regions of each means sensitive to radiation are sufficiently different such that when radiation is incident to the detector, there is a difference in forward and backward emissions of electrons between the first and second regions;

means to detect a signal from the at least two means sensitive to radiation.

11. The detector of claim 10 further comprising means to rotate the detector.

12. The detector of claim 11 wherein the means sensitive to radiation is a Geiger Mueller counter.

13. The detector of claim 12 wherein the Geiger Mueller counter has at least two sides which are permeable to radiation.

14. The detector of claim 13 wherein the at least two sides of the Geiger Mueller counter are made of thin.

15. The detector of claim 11 wherein the means sensitive to radiation is a scintillation counter.

16. The detector of claim 11 wherein the means sensitive to radiation is a solid state counter.

17. The detector of claim 11 wherein the first region of material is made of plastic and the second region of material is made of a high atomic number material.

18. The detector of claim 11 further comprising means to calculate the direction of a maximum number of signals from the means to detect a signal.

19. A radiation imager comprising:

at least two means sensitive to radiation, each means having at least a first and second side;

at least two regions of material having a first atomic number and disposed on each of the first sides of the means sensitive to radiation;

at least two regions of material having a second atomic number which is different from that of the atomic number of the first region of material and disposed on each of the second sides of the means sensitive to radiation;

wherein the first and second atomic numbers of the first and second regions of each means sensitive to radiation are sufficiently different such that when radiation is incident to the detector, there is a difference in forward and backward emissions of electrons between the first and second regions;

means to detect a signal from the at least two means sensitive to radiation;

means to rotate the imager; and means to calculate a first derivative of signals detected from the means to detect a signal and an angle of rotation of the imager.

* * * * *